Figure 1:
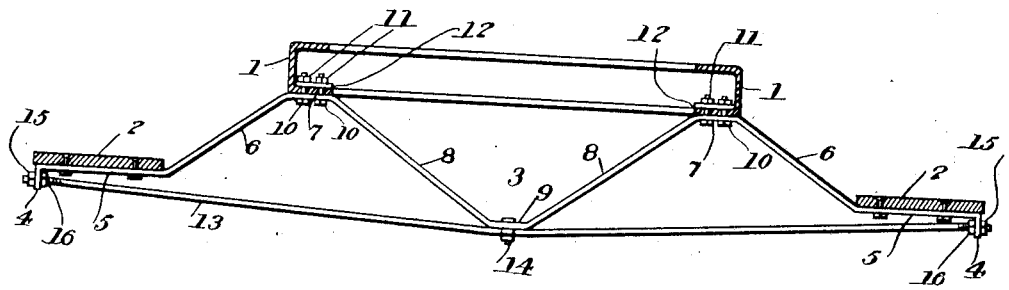

J. J. KUNTZ.
RUNNING BOARD SUPPORT.
APPLICATION FILED FEB. 27, 1917.

1,258,579.

Patented Mar. 5, 1918.

WITNESSES

INVENTOR
J. J. Kuntz.
BY Victor J. Evans
ATTORNEY

UNITED STATES PATENT OFFICE.

JAKE J. KUNTZ, OF OAKVILLE, IOWA.

RUNNING-BOARD SUPPORT.

1,258,579.     Specification of Letters Patent.     Patented Mar. 5, 1918.

Application filed February 27, 1917. Serial No. 151,298.

*To all whom it may concern:*

Be it known that I, JAKE J. KUNTZ, a citizen of the United States, residing at Oakville, in the county of Louisa and State of Iowa, have invented new and useful Improvements in Running-Board Supports, of which the following is a specification.

The present invention relates to improvements in means for supporting the running board upon the chassis of an automobile, and has for its object to produce simple means for this purpose which may be readily secured to the side sills of the automobile frame which will securely and effectively support the running board of the machine.

With the above and other objects in view the improvement resides in the construction, combination and arrangement of parts set forth in the following specification and falling within the scope of the appended claim.

Figure 2:
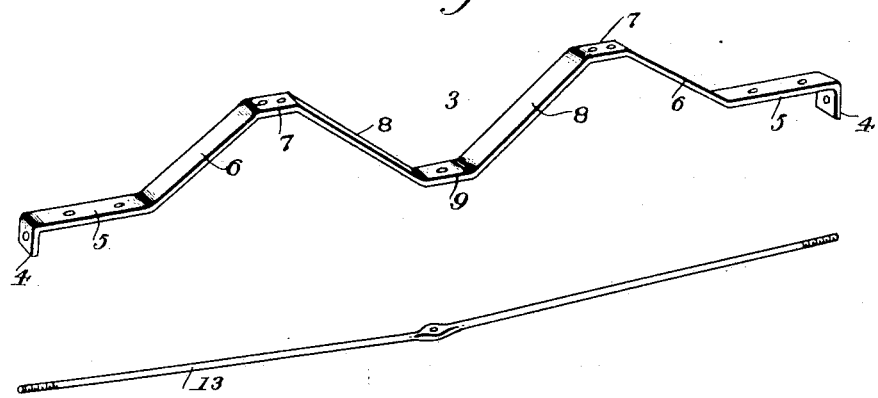

In the drawing:

Figure 1 is a transverse sectional view through the chassis of an automobile illustrating the application of the improvement, and Fig. 2 is a perspective view of the members comprising the improvement.

Referring now to the drawings in detail, the numerals 1—1 indicate the side sills of an automobile frame, and 2 the running boards of the automobile secured upon my improved supporting device, which is broadly indicated by the numeral 3. The device includes a member shaped to provide a double truss and reinforcing elements therefor. While two or more of the devices are employed upon each automobile, only one has been deemed necessary to illustrate in the drawing. Preferably the truss structure of the improvement is formed from a single bar of suitable metal, having flanged ends 4 arranged downwardly and right angularly with respect to the outer portions 5 of the said structure. From the straight portions the bar is extended angularly and upwardly, as indicated by the numeral 6, and is then continued in a line parallel to the outer members 5, as indicated by the numerals 7, and from thence is continued downwardly and angularly, as at 8, to the central straight portion 9 which is disposed parallel to the portions 5 and 7, but at a slight distance below the said outer portions 5. It will thus be noted that each of the devices comprises two members which are centrally formed to provide substantially V-shaped portions adjacent the ends thereof, and the flat portions 7 are adapted to rest directly under the side sills 1 and are secured thereto in any desired or preferred manner, as for instance, bolt members 10 may pass through openings in the portions 7 and in the lower plates of the side sills 1, while nuts 11 engage with the said bolts and preferably contact with a brace plate 12 to force the same against the upper surface of the side bar 2. The angular ends 4 are provided with alining openings through which passes a reinforcing rod 13, the said rod being centrally secured to the portion 9 of the truss stretcher, as at 14, while the threaded ends of the rod 13 are engaged by outer nuts 15 and inner nuts 16, whereby the said rod is adjustably connected to the ends 4 of the truss structure. The running boards 2 are secured upon the flat outer portions 5 of the truss structure in any desired or preferred manner.

It will be noted, from the above description, that I have provided a comparatively simple, cheap and effective means for retaining the running boards upon the frame of the automobile which will hold the said running boards against sagging, or movement in any direction.

Having thus described the invention, what I claim is:

In a running board support for vehicles, the combination with a chassis of a vehicle and the running boards therefor, of a bar to which the running boards are secured, said bar having its ends bent downwardly, the straight surfaces of the bar, inward of the running boards being further bent to provide two connecting substantially inverted V-shaped trusses upon which the chassis of the vehicle is secured, the connecting portion of the bar between the said trusses being arranged below the straight portions of the said bar, a rod having its ends passed through the angle ends of the bar and secured to the connecting element of the trusses to the said depending portion thereof between the trusses, and adjustable elements on the ends of the rod contacting with the inner and outer surfaces of the said angle ends of the bar.

In testimony whereof I affix my signature.

JAKE J. KUNTZ.

Copies of this patent may be obtained for five cents each, by addressing the "Commissioner of Patents, Washington, D. C."